US006068926A

United States Patent [19]

Sperling et al.

[11] Patent Number: 6,068,926

[45] **Date of Patent: *May 30, 2000**

[54] CARBON BRUSH AND PROCESS FOR IMPREGNATING SAME

[75] Inventors: Rainer Sperling, Biebertal; Harald Friedrich, Fernwald; Gunter Schardt, Giessen-Klein-Linden, all of Germany

[73] Assignee: Schunk Kohlenstofftechnik GmbH, Heuchelheim, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 08/892,281

[22] Filed: Jul. 14, 1997

Related U.S. Application Data

[63] Continuation of application No. 08/301,392, Sep. 8, 1994, abandoned.

[30] Foreign Application Priority Data

Sep. 9, 1993 [DE] Germany ............................ 43 30 547

[51] Int. Cl.[7] ...................................................... B32B 9/00

[52] U.S. Cl. ......................... 428/408; 427/114; 427/226; 427/374.3; 310/228; 310/251; 310/253

[58] Field of Search .................................... 427/114, 226, 427/374.3; 428/408; 310/228, 251, 253

[56] References Cited

U.S. PATENT DOCUMENTS

| | | | |
|---|---|---|---|
| 2,859,139 | 11/1958 | Ramadanoff | 117/228 |
| 3,088,964 | 5/1963 | Ryan | 260/448.2 |
| 3,751,294 | 8/1973 | Fridman et al. | 117/226 |
| 4,420,409 | 12/1983 | Fukano et al. | 252/78.3 |

OTHER PUBLICATIONS

Derwent Abstracts 86–070084, "Preventing Interference Sparking at Brushes in Electrical Machines".

Chemical Abstracts 105:125549, "Impregnated Carbon Brush for Electric Apparatus".

*Primary Examiner*—Frederick Krass

*Attorney, Agent, or Firm*—Dennison, Scheiner, Schultz & Wakeman

[57] ABSTRACT

The invention relates to a carbon brush, which is impregnated with a modified siloxane.

4 Claims, No Drawings

CARBON BRUSH AND PROCESS FOR IMPREGNATING SAME

This is a continuation of application Ser. No. 08/301,392 filed on Sep. 8, 1994, now abandoned.

The invention is related to a carbon brush which is impregnated with an impregnating compound, particularly a carbon brush for tools put under a great deal of stress. The invention further relates to a process for impregnating a carbon brush or a carbon bar.

U.S. Pat. No. 949,988 discloses an impregnated carbon brush for electrical machines, having an impregnating compound that contains grease, wax, or oil as a lubricant. At normal temperature, the impregnating agents are either fluid or solid and in an impregnating bath, in which the carbon brush is impregnated, are brought to a temperature which is equal to or above the melting point of the lubricant. If petroleum jelly is used as an impregnating compound, for example, the impregnation temperature is adjusted to about 100° C. After the impregnation process, the carbon brush is subsequently treated at a temperature which is at least as high as the maximal operating temperature.

Swiss Patent 262 391 describes a carbon brush whose mechanical properties are to be improved by impregnation, for example with polysiloxane. The impregnating agent—as in the above-disclosed prior art—is introduced under pressure into the pores of the carbon material. However, this does not conclude the impregnation. Rather, polymerization of the impregnating agent is then done at temperatures in the range between 100° C. and 150° C., for example, in order thus to improve the strength of the carbon brush.

German Patent 34 31 533 C2 discloses a carbon brush for electric machines, which contained chlorine-containing polymers formed by cross-linking of at least one compound from the group comprising chlorinated organochlorosilanes and chlorinated organosiloxanes.

Brush wear as a function of silicone vapor is examined in the literature, in AIEE Transactions 1948, pp. 1186–1190.

German Patent 26 09 834 C3 describes an impregnated carbon brush, which contains as its impregnating agent a nonmelting grease, a nonmelting wax, or a nonmelting oil; the grease, wax, or oil of the impregnating agent is intimately mixed with a gelling agent made of montmorillonite flakes, whose surfaces are coated with long-chain hydrocarbons, and in this way is converted to the nonmelting or nonfluid, harder, and abrasion-proof state. The impregnation is done by the vacuum pressure method.

Impregnated carbon brushes according to German Patent 26 09 834 C3 have proven themselves well in use have the advantages of good commutation, lower spark interference, long service life, and usability at high power. It would be desirable, though, if there were further advantages as regards the brush wear, collector wear, collector temperature occurring during operation, or the service life of the machine, particularly if used in machines having temperature sensitive commutators which are asbestos-free.

The object of the present invention is to improve a carbon brush which is impregnated with an impregnating compound, particularly a carbon brush for tools put under a great deal of stress, as well as a process for impregnation of a carbon brush or a carbon bar, such that further improvements of the mechanical performance of the carbon brush can be achieved, and particularly so that unproblematic use is possible in asbestos-free commutators. The impregnating compound should also be safe for the environment.

This object is attained in a carbon brush in that it is impregnated with a polyethersiloxane or a polymethylsiloxane.

Preferably it can be a polyethersiloxane with the following structure:

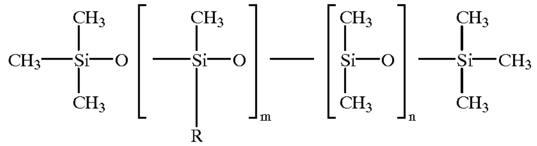

$m \geq 2$
$n = 1$ to 3
R = Polyether

The polymethylsiloxane can be copolymers of this, having ethylene oxide/propylene oxide segments.

In particular, it can be long chain polymethylsiloxane modified with alkyl and/or alkyl aryl radicals, with the following chemical structures:

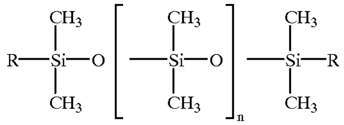

$m \geq 2$
$n = 1$ to 3
R = Alkyl aryl or

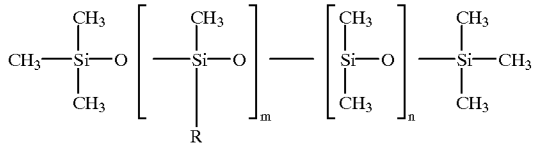

$m \geq 2$
$n = 1$ to 3
R =Alkyl or Alkyl + Polyether

If corresponding carbon brushes impregnated according to the invention are used, surprisingly a substantial reduction in the commutator temperature and an increase in the service life as well as a clear reduction in commutator corrosion can be ascertained. Consequently, corresponding carbon brushes are particularly suited for use in machines which have asbestos-free commutators.

It was possible to achieve a reduction in brush-collector wear as well as a reduction in the collector temperature, especially if the impregnating agent of the carbon brush amounts to roughly 0.5 to 15 weight percent.

According to the process, the object is attained in that the carbon brush or carbon bar is impregnated in an emulsion containing polyethersiloxane or polymethylsiloxane as an impregnating agent.

Surprisingly, it has been shown that the impregnation with the impregnating agent according to the invention need not be done by the vacuum pressure method; the carbon brush or the carbon bar need only be immersed in the emulsion. Preferably the period of time is between 0.5 and 5 hours, particularly between 1.5 and 2.5 hours. Afterwards, the carbon brush or the carbon bar is drained off and then, preferably by means of spinning, is dried at a temperature between room temperature (20° C.) and 90° C., particularly at approximately 80° C. Then the carbon brush is ready for immediate use, or the carbon bar can be immediately machined to a desirable shape for the carbon brush.-

According to the invention, water is used as the emulsifying agent, and a substance that is safe for the environment and cannot lead to health risks is used as the impregnating compound. Also, it is not required that the carbon brush be hot rinsed after impregnation, and hence, no undesirable vapors occur, either.

Further details, advantages, and characteristics of the invention are revealed not only by the claims and the characteristics to be inferred from them—alone and/or in combination—but also in the example described below.

A polymethylsiloxane modified by long chain alkyl radicals was stirred with water; the weight percentage of the impregnating agent was 5%. The homogenization to produce the emulsion was done at room temperature. After the emulsion was produced, then the carbon brush was immersed for a period of about 2 hours in the emulsion, which had been warmed to 80° C., and was then taken out to let the emulsion drain off. Next, the carbon brush was spin dried at a temperature of 80° C., without being rinsed afterward.

A testing of the carbon brush found that the weight percentage of the impregnating compound was approximately 5%.

A corresponding carbon brush was then built into a saber saw in order to determine working time, brush wear, collector wear, achieved service life, and collector temperature. The trial runs were then compared with a carbon brush which was impregnated with the known impregnating agent. The following results could be determined:

| Impregnating Agent | Brush Wear [μ/h] | Collector Wear [μ/h] | Service Life Achieved [h] | Collector Temp [° C.] |
|---|---|---|---|---|
| Prior Art | 188 | 2.75 | 47 | 60–160 |
| Impregnating Agent of the Invention | 90 | 0.6 | 90 | 40–65 |

We claim:

1. An electrical device comprising as a part thereof a carbon electrical commutator brush impregnated with 0.5 to 15 weight percent of a linear non-crosslinked liquid siloxane selected from the group consisting of polyethersiloxane and polymethylsiloxane, wherein the polyethersiloxane has the following structure:

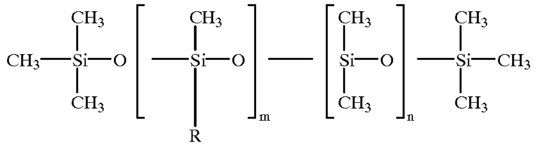

$m \geq 2$
$n$ = 1 to 3
R = Polyether.

2. An electrical device comprising as a part thereof a carbon electrical commutator brush impregnated with 0.5 to 15 weight percent of a linear non-crosslinked liquid siloxane selected from the group consisting of polyethersiloxane and polymethylsiloxane, wherein the polymethylsiloxane has the following structure:

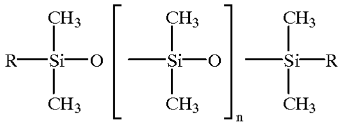

$n$ = 1 to 3
R = alkyl.

3. An electrical device comprising as a part thereof a carbon electrical commutator brush impregnated with 0.5 to 15 percent by weight of a linear non-crosslinked liquid siloxane selected from the group consisting of polyethersiloxane and polymethylsiloxane, wherein the polymethylsiloxane has the following structure:

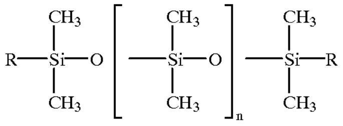

$n$ = 1 to 3
R = aralkyl.

4. An electrical device comprising as a part thereof a carbon electrical commutator brush impregnated with 0.5 to 15 weight percent of a linear non-crosslinked liquid siloxane wherein the siloxane has the following structure:

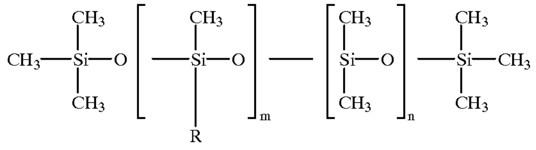

$m \geq 2$
$n$ = 1 to 3
R =Alkyl or Alkylpolyether.

* * * * *